United States Patent [19]

Dezonno

[11] Patent Number: 4,847,720

[45] Date of Patent: Jul. 11, 1989

[54] POWER SUPPLY OUTPUT PROTECTION CIRCUITRY WITH SIGNALING

[75] Inventor: Anthony J. Dezonno, Downers Groove, Ill.

[73] Assignee: Rockwell International Corporation, El Segundo, Calif.

[21] Appl. No.: 190,277

[22] Filed: May 4, 1988

[51] Int. Cl.⁴ .............................................. H02H 7/10
[52] U.S. Cl. .................................................... 361/18
[58] Field of Search ....................... 361/18, 86, 88, 90, 361/91, 92; 363/50, 52, 276; 340/660, 661, 662, 663

[56] References Cited

U.S. PATENT DOCUMENTS

| | | | |
|---|---|---|---|
| 3,836,790 | 9/1974 | Becker | 361/90 X |
| 4,238,696 | 12/1980 | Smart | 361/90 X |
| 4,439,805 | 3/1984 | Tarleton | 361/92 |
| 4,541,029 | 9/1985 | Ohyama | 361/90 X |
| 4,707,760 | 11/1987 | Allos | 361/90 |
| 4,772,980 | 9/1988 | Curtis et al. | 361/90 |

*Primary Examiner*—Derek S. Jennings
*Attorney, Agent, or Firm*—C. B. Patti; V. L. Sewell; H. F. Hamann

[57] ABSTRACT

A circuit is provided for detecting out of range or specification voltages of a power supply output and for disabling the power supply in response thereto. Disabling of the power supply is effected in time delay fashion and a signal is generated to indicate impending disabling of the power supply. The signal may be used to trigger dumping of logic circuit information to registers pending shutdown of the power supply.

7 Claims, 2 Drawing Sheets

POWER SUPPLY OUTPUT PROTECTION CIRCUITRY WITH SIGNALING

BACKGROUND OF THE INVENTION

1. Field of the Invention

The present invention pertains generally to electrical power supplies and, particularly, to protection circuitry which provides delayed disabling of a power supply and signaling of impending such disabling upon detection of overvoltage or undervoltage power supply output. 2. Discussion of the Related Art: Industrial power supplies are used to provide electrical power to a variety of devices which include digital logic circuitry. Many times a multitude of small power output power supplies are arranged in a distributed power architecture fashion such that each power supply supplies a small amount of power to specific circuits or circuit boards. This distributed power architecture contrasts with a power supply arrangement wherein several larger power supplies are used to provide electrical power to all circuits over several power busses. However, such small power output power supplies generally do not incorporate any type of fault analysis circuitry for detection of out of range or out of specification power supply output voltage, i.e., overvoltage or undervoltage. When overvoltage or undervoltage output is supplied by a power supply, logic circuit results are unreliable because the results of logic operations are unpredictable and many times erroneous. Additionally, valuable information may be lost when a power supply output exceeds prescribed limits, producing such unreliable results, and steps are not taken to preserve such information pending shutdown of the power supply.

SUMMARY OF THE INVENTION

The present invention provides a method and means for monitoring a power supply output to detect overvoltage and undervoltage output states, for disabling the power supply upon detection of an overvoltage or undervoltage output state in a delayed time fashion and for signaling impending disabling of the power supply. Additionally, the invention provides means for adjustment, thus permitting selection of any overvoltage - undervoltage range within which said disabling and signaling is not triggered. Concomitantly, adjustment means is provided for preselecting a delay period between detection of an overvoltage or undervoltage state and disabling of the power supply.

To accomplish the foregoing, a circuit is provided in which two comparators are used to monitor voltage of a power supply output. In one comparator, the power supply output is compared to a high or overvoltage reference voltage. Whenever the power supply output voltage exceeds the overvoltage reference voltage, overvoltage is detected and the overvoltage coparator generates an overvoltage signal. In the other comparator, the power supply output voltage is compared to a low or undervoltage reference voltage. Whenever the power supply voltage falls below the undervoltage reference voltage, the undervoltage comparator detects undervoltage and ceases to generate a signal indicating normal voltage. The overvoltage signal is also used to simulate an undervoltage state. Thus, for either overvoltage or undervoltage detection, the undervoltage comparator is caused to cease generation of a normal voltage signal.

Upon cessation of the normal voltage signal, a photoisolator LED normally driven by the normal voltage signal, ceases to emit light, the light normally being received by a phototransistor coupled to a pulse width modulator of the power supply output. When the phototransistor fails to receive light from the LED, a capacitor is permitted to charge for a predetermined time in accordance with known capacitor/resistor circuit principles. Once charged, the capacitor provides a voltage input to the pulse width modulator to thereby turn same off, thus disabling the power supply.

While the capacitor is charging, an output voltage is raised from ground potential to the level of the power supply output to indicate impending disabling of the power supply. The impending disabling signal is made available to logic circuitry to enable dumping of information in the circuitry to registers before disabling of the power supply.

Thus, it is an object of the present invention to provide a circuit which detects overvoltage and undervoltage states in a power supply output, which disables the power supply after a preselected period, and which signals impending disabling of the power supply. An aspect of the present invention is the use of comparators to detect overvoltage and undervoltage power supply output and to generate a signal indicating impending disabling of the power supply for a preselected period prior to disabling of the power supply.

These and other objects and aspects will become more apparent by reference to the drawings and the description of the preferred embodiment.

DESCRIPTION OF THE PREFERRED EMBODIMENTS

Figure 1:
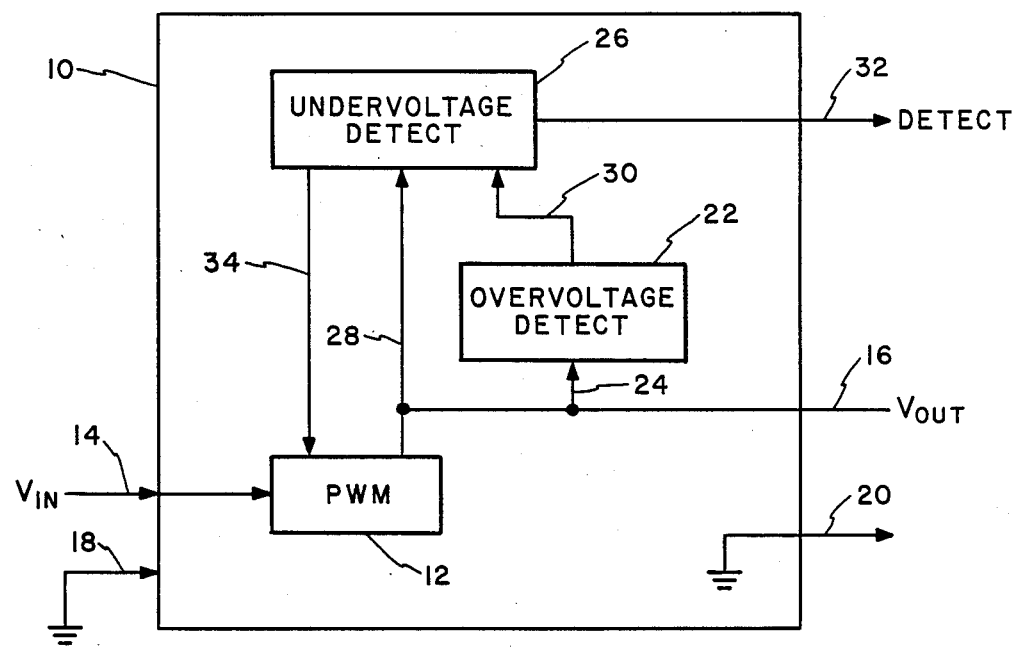
FIG. 1 is a functional diagram of a power supply embodying principles of the invention.

A power supply 10 embodying principles of the invention is shown in block diagram form in FIG. 1. Therein it is shown that the power supply 10 is provided with a pulse width modulator 12 as is well known in the art. The pulse width modulator 12 is used to square away a source.

Further shown in FIG. 1, a voltage V-in is input at lead 14 from a system power source, not shown. Typically, such system power source will convert 120 volts AC to 48 volts DC for use by the power supply 10. The power supply 10 then is used to generate a power supply output V-out at lead 16 of approximately 5 volts for use in TTL logic circuit boards. It is noted that the principles of this invention are applicable to any power supply and references to specific voltages are made for illustrative purposes only.

A first ground at lead 18 and a second ground at lead 20 provide leads at ground potential for the power supply 10 and circuitry, not shown, coupled to said power supply 10.

The power supply output $V_{out}$ is directed to an overvoltage detector 22 over lead 24. Concurrently, the power supply output V-out is directed to an undervoltage detector 26 over lead 28. As described in detail below, the overvoltage detector 22 detects an overvoltage state whenever the power supply output V-out rises above a preselected overvoltage reference voltage while the undervoltage detector 26 detects an undervoltage state whenever the power supply output V-out falls below another preselected undervoltage reference voltage. Upon detection of an overvoltage state, the overvoltage detector transmits a signal over lead 30 to cause a simulation of an undervoltage state. The undervoltage detector 26 reacts accordingly and a "DETECT" signal is emitted over lead 32 to indicate that disabling or shutdown of the power supply 10 is impending. The DETECT signal may be used by the circuitry coupled to the power supply output V-out to trigger dumping of circuit information to registers, thereby saving such information for future use, e.g., upon restoration of proper power supply output voltage or for fault analysis. After passage of a preselected time period, a shutdown or disabling signal is transmitted over lead 34 to the pulse width modulator 12 to disable the power supply output V-out from the pulse width modulator 12.

Figure 2:
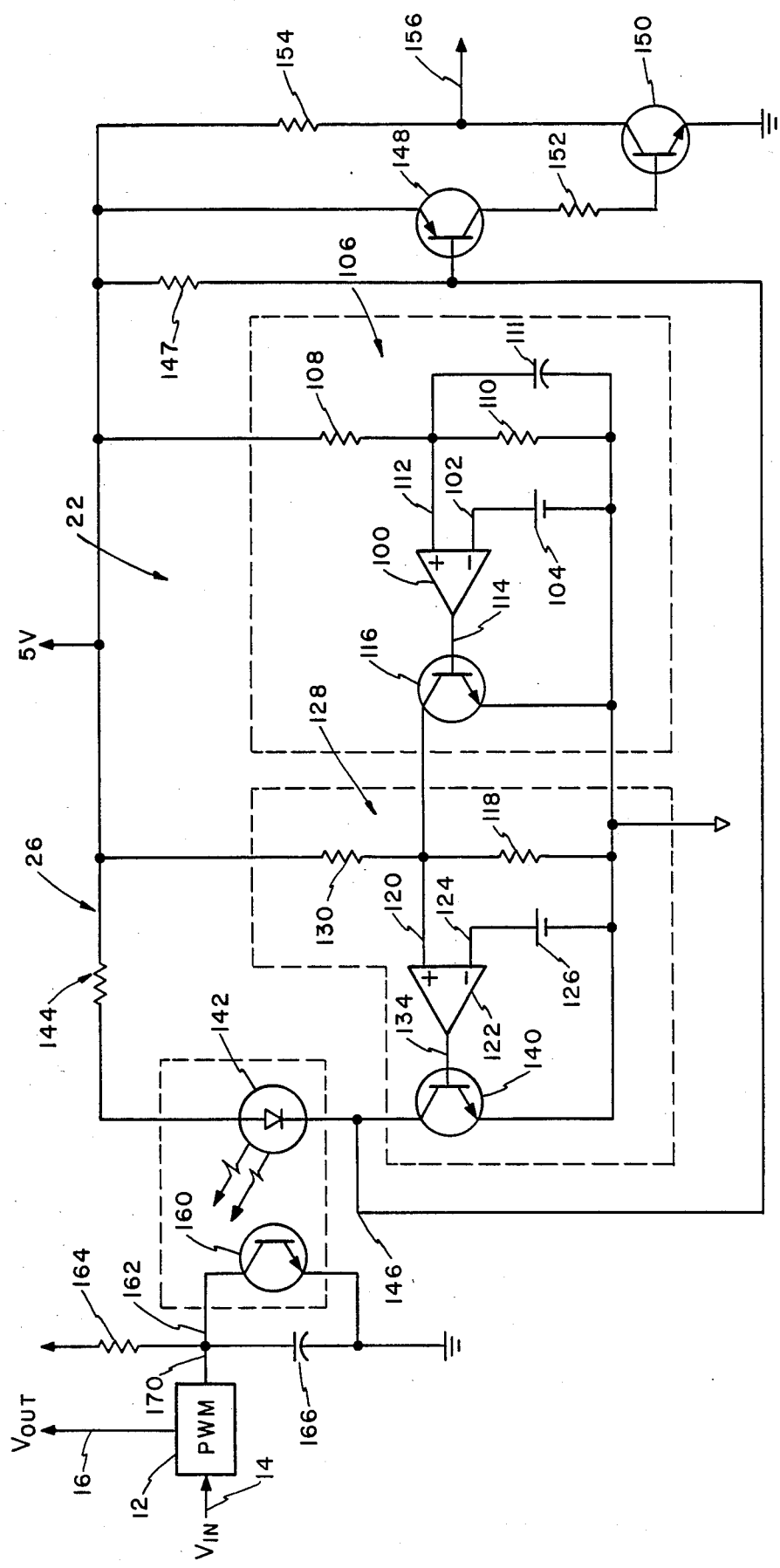
FIG. 2 is a circuit diagram of a circuit embodying principles of the invention.

Shown in FIG. 2 is a detailed circuit diagram of the preferred embodiment for carrying out principles of the invention as used in the embodiment of FIG. 1.

As can be seen in FIG. 2, the overvoltage detector 22 includes an operational amplifier 100 which is used as a comparator. An overvoltage reference voltage is generated at input 102 using a voltage reference 104 as is well known in the art. The power supply output V-out is divided by resistor divider 106 made up of resistors 108 and 110 and capacitor 111. A resulting voltage is input at lead 112 into the operational amplifier or comparator 100.

Whenever the power supply output V-out exceeds a voltage determined by the value of the voltage reference 102 and the voltage divider 106, the operational amplifier or comparator 100 will turn on and generate a signal at lead 114. The signal at the lead 114 in turn turns on transistor 116, which, when on, creates a short circuit across resistor 118 thus simulating zero or low voltage at 120. As will be explained below, the capacitor 111 causes a delay in the detection of overvoltage as a rise in the power supply output V-out is directed to ground for a determinable amount of time through the capacitor 111 as is well known in the art.

The undervoltage detector 26 can be seen to include an operational amplifier 122 which forms another comparator. An undervoltage reference voltage is provided at 124 by voltage reference 126 as is well known in the art. The power supply output V-out is again divided by a voltage divider 128 made up of resistors 130 and 118. A resulting voltage is produced at lead 120 and input into the operational amplifier or comparator 122.

The operational amplifier or comparator 122 is normally in an on state and generating an output at lead 134. However, whenever the resulting voltage at the lead 120 falls below the undervoltage reference voltage at the lead 124, the operational amplifier or comparator 122 turns off as is well known in the art.

It is evident that either an overvoltage state or an undervoltage state will cause the undervoltage operational amplifier or comparator 122 to turn off as an undervoltage state will produce an undervoltage at the lead 120 as will an overvoltage state through the activation of the transistor 116. Thus, detection of either an overvoltage state or an undervoltage state in the power supply output V-out will cause the same result in the circuitry following the output at the lead 134 of the comparator 122.

The normally on operational amplifier or comparator 122 drives a transistor 140 such that current is allowed to be drawn through photoisolator or LED 142. The LED 142 is powered by the power supply ouptut V-out through a resistor 144. Thus, under normal operating conditions, the LED 142 is on and emits light. Conversely, upon detection of an overvoltage or undervoltage state, the comparator 122 will cause the LED 142 to turn off.

When the transistor 140 is caused to turn off by the comparator 122, a potential at lead 146, normally driven to ground, is allowed to rise to nearly the level of the power supply output V-out through resistor 147. When this occurs, a transistor 148 is caused to switch off, which in turn deactivates another transistor 150 through a resistor 152. Once the transistor 150 is driven off, current is drawn through a resistor 154 coupled to the power supply output V-out to produce a DETECT signal at lead 156 indicating a fault, i.e, overvoltage or undervoltage, in the power supply 10. Because of the nature of the delay in the disabling or shutdown of the power supply 10, as described below, the DETECT signal at the lead 156 actually indicates impending shutdown and thus, serves as a warning before shutdown of the power supply 10. Thus, information contained within any circuit coupled to the power supply output V-out may be stored before shutdown by dumping the information to registers or the like so as to preserve it for future use.

The normally on LED 142 drives a transistor 160 as is known in the art. The transistor 160, when driven, allows current to conduct through it and thus, drives a potential at lead 162 to ground. However, when the LED 142 is caused to turn off, the transistor 160 turns off and the potential at the lead 162 is allowed to rise nearly to the level of power source input V-in through resistor 164. Additionally, a capacitor 166 coupled to the lead 162 is permitted to begin charging. The capacitor 166 will charge for a time period defined by the values of the resistor 164 and the capacitor 166 as is well known in the art. Thus, the potential at the lead 162 will rise in accordance with an RC constant defined by the resistor 164 and the capacitor 166.

The lead 162 is also coupled to an enabling pin lead 170 on the pulse width modulator 12. When the potential at the lead 162 is low or at ground level, the pulse width modulator 12 is enabled and permitted to provide the power supply output V-out. However, when the potential at the lead 162 is permitted to become sufficiently high, the pulse width modulator 12 is disabled and no longer permitted to produce the power supply output V-out.

Figure 3:
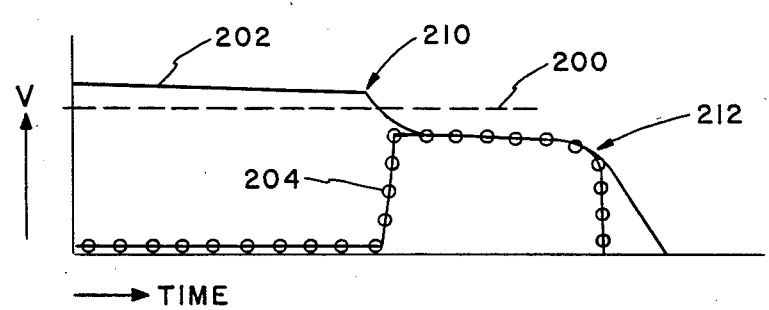
FIG. 3 is a graphical representation of reactions within the circuit of FIG. 2 over time in response to detection of undervoltage.
Figure 4:
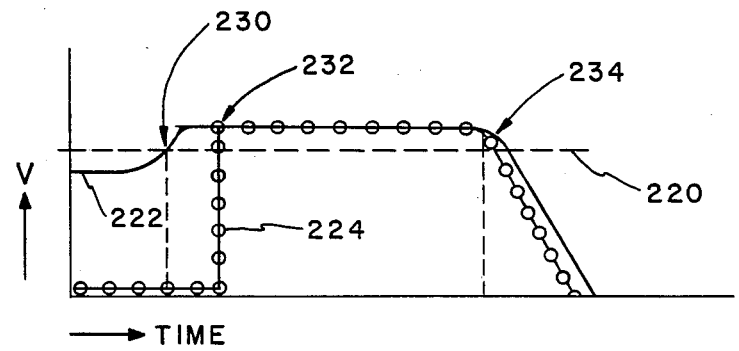
FIG. 4 is a graphical representation of reactions within the circuit of FIG. 2 over time in response to detection of overvoltage.

Thus, from the foregoing and with reference to FIGS. 3 and 4, it is apparent that the invention provides the DETECT signal at the lead 156 to indicate fault and impending shutdown of the power supply as well as a delayed shutdown of the power supply output V-out. With reference to FIGS. 3 and 4, the timing of such shutdown will be explained.

In FIG. 3, there is shown the timing diagram for signals of the circuit of FIG. 2 upon detection of undervoltage. The undervoltage reference voltage provided at the lead 124 is indicated by line 200. The actual voltage of the power supply ouptut V-out over time is indicated by line 202. The voltage of the DETECT signal at the lead 156 is indicated by the line 204.

As is indicated by the line 200, the reference undervoltage at the lead 124 is held constant until the power supply output V-out is shutdown. The power supply output V-out for any of a variety of reasons is caused to fall below the reference undervoltage at the lead 124 at a point in time indicated as point 210. The DETECT signal shown as the line 204, which is normally at zero or ground potential, is caused to rise to the level or nearly the level of the power supply output V-out at the point in time indicated as the point 210. Then for the time period defined by the product of the values of the resistor 164 and the capacitor 166, the DETECT signal is maintained at the lead 156. Upon passage of such time period, indicated as the point 212, the pulse width modulator 12 is shutdown and all of the signals are similarly shutdown.

In FIG. 4, there is shown the timing circuit for certain signals of the circuit of FIG. 2 upon detection of an overvoltage state. The overvoltage reference voltage at the lead 102 is indicated by line 220. The actual value of the power supply output V-out is indicated by line 222. The voltage of the DETECT signal generated at the lead 156 is indicated by line 224.

When the power supply output V-out shown by the line 222 exceeds the overvoltage reference voltage shown by the line 220 at a point in time indicated as point 230, the comparator 100 would normally turn on, but the reaction of the comparator 100 is delayed by inherent RC characteristics of the RC circuit including the resistor 110 and the capacitor 111. This delay compensates for transients which may cause false detections. After a time period defined by the product of the value of the resistor 110 and the capacitor 111 and shown by point 232, the DETECT signal at the lead 152 is permitted to rise to the level or nearly the level of the power supply output V-out. After a period of time defined by the product of the values of the resistor 164 and the capacitor 166 and shown as point 234, the pulse width modulator 12 is disabled and all of the signals are shutdown.

It is apparent that the circuit of FIG. 2 inherently compensates for transient surges or falls in the power supply output V-out. Because any overvoltage or undervoltage state must exist for more than the time period defined by the resistor 164 and the capacitor 166 in order for the circuit to shutdown the pulse width modulator 12, any state existing for less than such time period will not cause such a shutdown although it will cause generation of the DETECT signal at the lead 156.

Thus, from the foregoing, a circuit has been described for carrying out principles of the invention in which a method and means have been described for shutting down a power supply upon detection of an overvoltage or undervoltage state in the power supply output, for signaling the existence of such a state and for signaling impending shutdown of the power supply. While a preferred embodiment has been described, there may be modifications apparent to those skilled in the art which fall within the spirit and scope of the invention. It is intended that such modification be covered as well by the attached claims.

We claim:

1. An apparatus for monitoring an electrical power supply output voltage, comprising:
   a first comparator with a first input coupled to said power supply output and a second input coupled to an overvoltage reference voltage,
      said first comparator turning on upon rising of said power supply output voltage above said overvoltage reference voltage;
   a second comparator with a first input coupled to said power supply output and an output of said first comparator and a second input coupled to an undervoltage reference voltage,
      said second comparator normally being on but being turned off whenever said first compartor is turned on and whenever said power supply output voltage falls below said undervoltage reference voltage;
   a signal circuit coupled to an output of said second comparator for generating a signal having a voltage substantially equal to that of said power supply output; and
   a shutdown circuit coupled to said output of said second comparator for disabling said power supply output.

2. An apparatus as set forth in claim 1, wherein said shutdown circuit includes a resistor-capacitor series circuit for disabling said power supply output in time delay fashion.

3. An apparatus as set forth in claim 2, wherein said shutdown circuit includes a light emitting diode coupled to said second comparator output and a phototransistor coupled to said power supply for effecting photoisolation coupling of said second comparator output to said power supply shutdown circuit.

4. An apparatus as set forth in claim 3, wherein said signal circuit includes a transistor for coupling said power supply output to a signal circuit output such that upon turning off of said second comparator, said transistor is turned on to raise said signal circuit output voltage substantially equal to that of said power supply output voltage.

5. An apparatus for monitoring an electrical power supply output, comprising:
   first circuit means coupled to said power supply output for effecting a comparison of said power supply output voltage with at least one reference voltage and for generating a signal change upon a deviation of said power supply voltage from said reference voltage;
   second circuit means coupled to said first circuit means for generating a detect signal in response to receipt of said signal change;
   third circuit means coupled to said first circuit means for effecting disabling of said power supply output in time delay fashion in response to receipt of said signal change;
   a delay circuit, included in said third circuit means, having a delay cricuit coupled to a disabling pin of said power supply to delay the deisabling of said power supply; and
   a photo-isolating coupling, included in said third circuit means, between said third circuit means and said first circuit means comprising a light emitting diode coupled to said first circuit means and a phototransistor coupled to said third circuit means.

6. An apparatus for monitoring an electrical power supply output, comprising:
   first circuit means coupled to said power supply output for generating a signal change upon exceeding by said power supply output of a first referenced voltage and generating a signal change upon not exceeding of said power supply output voltage of a second reference voltage and having a first camparator which turns on whenever said power output voltage exceeds said first reference voltage and a second comparator which turns off whenever said power supply output voltage does not exceed said second reference voltage;

second circuit means coupled to said first circuit means for generating a detect signal in response to receipt of said signal change; and third circuit means coupled to said first circuit means for effecting disabling of said power supply output in time delay fashion in response to receipt of said signal change.

7. An apparatus as set forth in claim 6, wherein an output of said first comparator is coupled to an input of said second comparator such that said second comparator turns off whenever said first comparator turns on.

* * * * *